April 8, 1952     E. NUDELMAN     2,592,456
CHILDREN'S DOMESTIC UTENSIL SET
Filed April 23, 1949
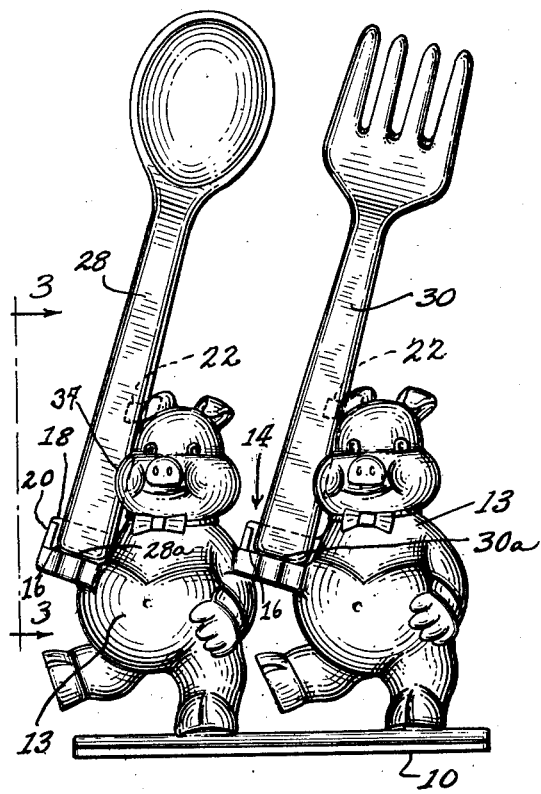
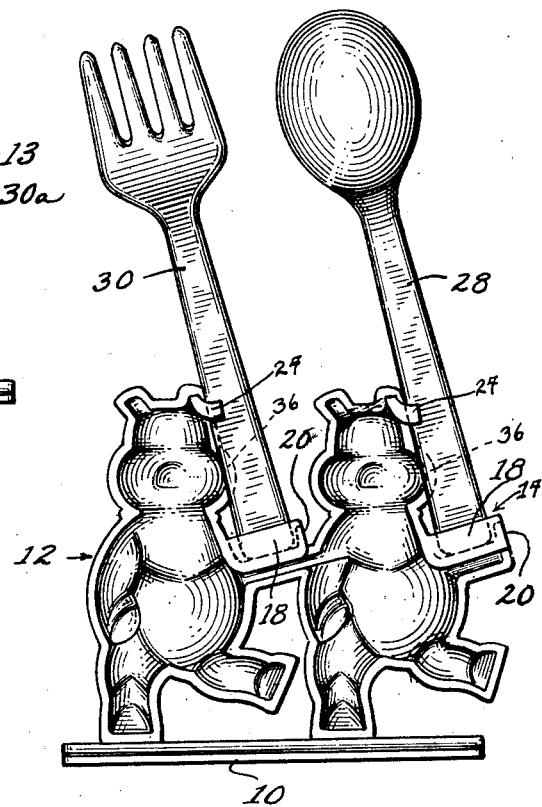
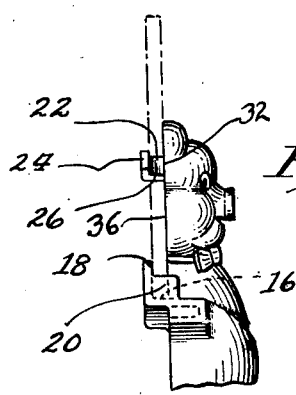
Inventor
Eoina Nudelman
By Max R. Kraus
Atty.

Patented Apr. 8, 1952

2,592,456

UNITED STATES PATENT OFFICE 2,592,456

CHILDREN'S DOMESTIC UTENSIL SET

Eoina Nudelman, Chicago, Ill.

Application April 23, 1949, Serial No. 89,195

1 Claim. (Cl. 211—60)

This invention relates to a children's domestic utensil set.

One of the objects of this invention is to provide a domestic utensil set consisting of a spoon, fork and the like, with means for detachably supporting same on a stand or support, in a manner that will be attractive to the child and stimulate the use of same.

Another object of this invention is to provide a children's domestic utensil set consisting of a spoon, fork and the like which are detachably and interchangeably supported on a stand which is formed to simulate a character, such as an animal or other figure, with the spoon and fork supported in upright position and the feeding ends thereof extending upwardly of the stand.

Another object of this invention is to provide a children's domestic utensil set consisting of a pair of animal or other characters having lateral supports closely approximating that of the arms of the character and on which are detachably and interchangeably supported a pair of feeding implements such as a spoon, fork or the like, with same extending upwardly from the support and with the feeding end of the implement being exposed and positioned at the upper end of the utensil set.

Other objects will become apparent as this description progresses.

In the drawings:

Fig. 1 is a front view showing the parts in assembled position.

Fig. 2 is a rear view of same, and

Fig. 3 is a side elevational view taken on lines 3—3 of Fig. 1.

The device comprises a horizontal base 10, having an integral vertical support or upright stand 12, all preferably formed of plastic or the like. The vertical support or stand is molded to form in relief the complete figure or representation of an animal or other character 13, and as shown is formed to simulate two piggies in marching position, although it will be understood that other characters in various other positions come within the purview of this invention. The vertical support which simulates the toy characters has a pair of inclined lateral extensions 14 which are identical in construction, and each provides a flat surface 16, an upright rear ledge 18 and an end wall 20. On each said lateral extension is rested the handle end of the feeding utensil or implement.

Formed integrally with the upper portion of the stand, or the toy character figure, is a rearwardly extending member 22 which has a short lateral extension 24 spaced from the rear wall 32 of the stand, to provide a space 26 therebetween. The shape of the character, as for instance the face of the piggie in the drawings, extends slightly outwardly to the left as at 34 so that the rear wall 36 thereof forms a front support for the handle of the spoon or fork when positioned as shown in Figs. 1 and 2.

The feeding utensils, such as a spoon 28, fork 30, or a knife has the outer end 28a and 30a respectively, of the handle portion resting on the surface 16 of the lateral supports 14, with the feeding utensil supported in an angular upright position. A portion of the handle of the feeding utensil fits between the rear wall 32 of the upright and the lateral extension 24 and within the space 26 defined therebetween, to be detachably secured therein in the positions shown in Figs. 1 and 2. The feeding utensil is supported on the lateral extensions 14, but the locking thereof is maintained in the space 26. As previously stated, the rear wall 36 of the face 34 of the support provides an additional engaging surface with the front wall of the handle portion and thus provides additional support for the feeding utensils. The rear ledge 18 and end wall 20 of the lateral extensions prevent the spoon or fork from being knocked off, and the way to remove the feeding implement is to engage the upper portion of the handle and move it to the left on the lateral extension, thereby disengaging it from between the rears 32 and 36 of the front walls and the lateral extension 24, and then lifting it up and out from the lateral extension. Insertion of the feeding implement may be obtained by reversing the procedure.

It will be seen that the support or stand comprising the two animal characters are all integrally molded with the lateral extension 14 of the right hand figure extending to the left hand figure to form an integral unit. It will obviously be understood that as many of such characters may be thus formed, or for that matter, it may support only a single feeding implement, or one such character may be formed to support a pair of feeding implements by positioning one of the feeding elements on each of the sides of the character, similar to that shown herein.

It will be understood that this invention is not limited or restricted to the specific type of character shown but that any such characters may be used in a similar arrangement. It will likewise be understood that various changes and modifications may be made without departing from the spirit and scope of my invention.

I claim:

A children's domestic utensil set comprising a base, at least one toy character supported on said base, said toy character having a projecting platform adapted to support a feeding utensil resting on one end thereof, a plurality of projections extending laterally, at least two of said projections being in the same vertical plane and at least one of said projections being in a plane spaced from said last mentioned projections so as to engage said utensil on opposite sides thereof and to retain same in a vertical plane between said projections.

EOINA NUDELMAN.

REFERENCES CITED

The following references are of record in the file of this patent:

UNITED STATES PATENTS

| Number | Name | Date |
|---|---|---|
| D. 160,731 | Nudelman | Oct. 31, 1950 |
| 1,094,995 | Imhof | Apr. 28, 1914 |
| 1,103,327 | Thomson | July 14, 1914 |
| 1,473,800 | Webb | Nov. 13, 1923 |
| 1,544,267 | Munson | June 30, 1925 |
| 2,498,413 | Glass | Feb. 21, 1950 |

FOREIGN PATENTS

| Number | Country | Date |
|---|---|---|
| 351,105 | Great Britain | June 25, 1931 |